US009449527B2

(12) United States Patent
Lutz et al.

(10) Patent No.: US 9,449,527 B2
(45) Date of Patent: Sep. 20, 2016

(54) BREAK-FIX SIMULATOR

(75) Inventors: Joseph Gerard Lutz, South Setauket, NY (US); Douglas Milligan, Middle Island, NY (US)

(73) Assignee: CA, Inc., New York, NY (US)

( * ) Notice: Subject to any disclaimer, the term of this patent is extended or adjusted under 35 U.S.C. 154(b) by 566 days.

(21) Appl. No.: 13/591,966

(22) Filed: Aug. 22, 2012

(65) Prior Publication Data

US 2014/0057231 A1 Feb. 27, 2014

(51) Int. Cl.
*G09B 19/00* (2006.01)
*G09B 5/00* (2006.01)
*G09B 7/00* (2006.01)
*G09B 9/00* (2006.01)

(52) U.S. Cl.
CPC ............... *G09B 19/00* (2013.01); *G09B 5/00* (2013.01); *G09B 7/00* (2013.01); *G09B 9/00* (2013.01)

(58) Field of Classification Search
CPC ............................. G09B 19/00; G09B 23/185
USPC ..................................... 434/219, 224; 703/6
See application file for complete search history.

(56) References Cited

U.S. PATENT DOCUMENTS

| 5,147,206 | A  | * | 9/1992  | Golenski ................ 434/219 |
| 5,860,810 | A  | * | 1/1999  | Faul ................ G09B 19/00 434/219 |
| 6,371,765 | B1 | * | 4/2002  | Wall ................ G09B 5/00 434/224 |
| 8,406,682 | B2 | * | 3/2013  | Elesseily ............ G06Q 10/06 434/219 |
| 2006/0252024 | A1 | * | 11/2006 | Lammers ............ G09B 25/08 434/365 |

* cited by examiner

*Primary Examiner* — Sam Yao
*Assistant Examiner* — Elroy S Crocker
(74) *Attorney, Agent, or Firm* — Baker Botts L.L.P.

(57) ABSTRACT

A system, apparatus, method, and computer program product for implementing at least one break-fix simulation are disclosed. A processor implements the at least one break-fix simulation by invoking a virtualization of a product that is configured to provide a service, executing one or more scripts that are configured to break the virtualization of the product so that at least a portion of the service fails, receiving first input via a user interface that is configured to access one or more tools for restoring the at least a portion of the service to working order, and restoring the at least a portion of the service to working order with the one or more tools utilizing the first input.

21 Claims, 12 Drawing Sheets

BREAK-FIX SIMULATOR

BACKGROUND

The present disclosure generally relates to break-fix support. The disclosed embodiments relate more specifically to a system, apparatus, method, and computer program product for providing a break-fix simulator for training and testing support technicians.

In the information technology (IT) industry, the term "break-fix" generally is used to refer to the work involved in supporting an IT solution when that solution fails, or breaks, and needs intervention by some support organization to be restored, or fixed, to working order. Under the break-fix model, a customer who has purchased an IT solution from an IT solution provider contacts a support technician at the IT solution provider when the customer experiences problems with its IT solution. That contact may be in the form of a telephone call and/or a written incident report in which the customer provides a description of the problem(s) it is experiencing with the IT solution. The support technician then accesses the IT solution and attempts to resolve the problem(s) based on the description provided by the customer.

Because an IT solution provider's customers generally are not as knowledgeable about the underlying technology in an IT solution as the IT solution provider, the descriptions provided to support technicians by those customers often are general and directed to the result of the problem, rather than its cause. And the same result may have several different causes. Moreover, different customers may describe the same problem differently. Such descriptions often make it difficult for support technicians to diagnose and resolve problems in an efficient, repeatable manner.

Those difficulties are compounded when the IT solution provider supports many different products with many different releases. Not only must a support technician be able to interpret different customers' different descriptions in an efficient, repeatable manner, they also must do so for a large number of products and product releases. Training support technicians on such a large scale presents a serious logistical challenge. Moreover, creating different tutorials for such a large number of products and product releases would require a large amount of resources.

BRIEF SUMMARY

The present disclosure is directed to system, apparatus, method, and computer program product for implementing at least one break-fix simulation are disclosed. In an embodiment of the apparatus of the present disclosure, a processor implements the at least one break-fix simulation by invoking a virtualization of a product that is configured to provide a service, executing one or more scripts that are configured to break the virtualization of the product so that at least a portion of the service fails, receiving first input via a user interface that is configured to access one or more tools for restoring the at least a portion of the service to working order, and restoring the at least a portion of the service to working order with the one or more tools utilizing the first input.

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

Figure 1:
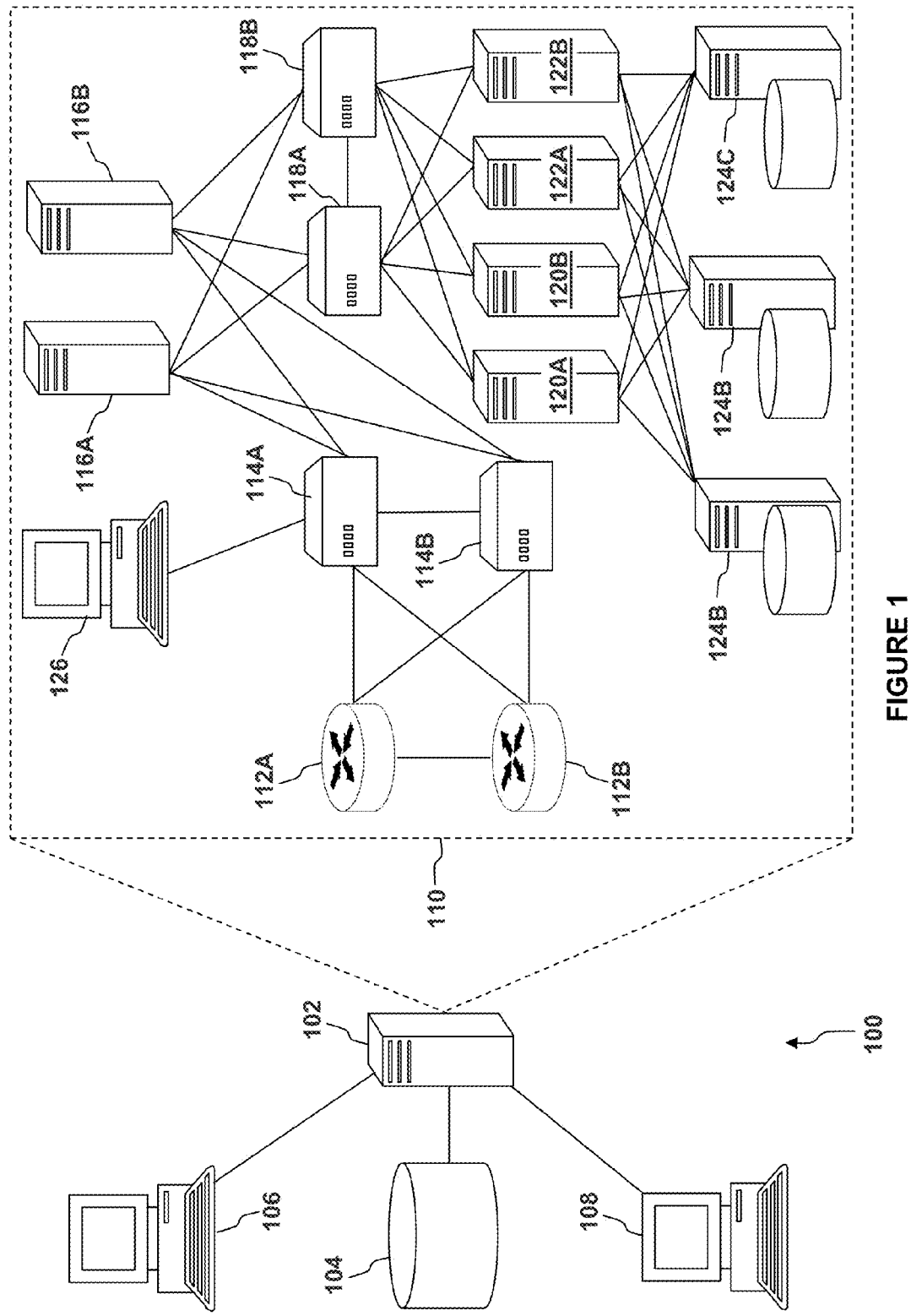
FIG. 1 is a schematic diagram illustrating an example of a simulation system according to a non-limiting embodiment of the present disclosure.

As will be appreciated by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Turning to the drawings, FIG. 1 illustrates a simulation system 100 according to a non-limiting embodiment of the present disclosure. The simulation system 100 comprises a simulator server 102, a server-side simulator database 104, an administrative graphical user interface (GUI) 106, and a teaching GUI 108 that are in electronic data communication with each other via a network connection. That network connection may be any suitable wired or wireless connection that supports electronic data communications between those devices 102-108, such as a LAN connection, a wireless LAN (WLAN) connection, a WAN connection, a cellular network connection (e.g., a Global System for Mobile Communications (GSM) connection, a Code Division Multiple Access (CDMA) connection, a Long Term Evolution (LTE) connection, etc.), or a combination of two or more of those connections.

The simulator server 102 is configured to generate a fully functional virtual image, or virtualization, of an IT solution 110 and to build and implement break-fix simulations in that IT solution 110. The simulator database 104 is configured to store the various data records, files, and other objects utilized by the simulator server 102 to build and implement break-fix simulations in the IT solution 110. The administrative GUI 106 is configured to provide functionality for an administrative user to build break-fix simulations and to provide support to a support technician during those simulations. And the teaching GUI 108 is configured to provide functionality for a support technician to run various break-fix simulations, to attempt to fix various breaks, and to obtain assistance from an administrator while attempting to fix those breaks.

Figure 2:
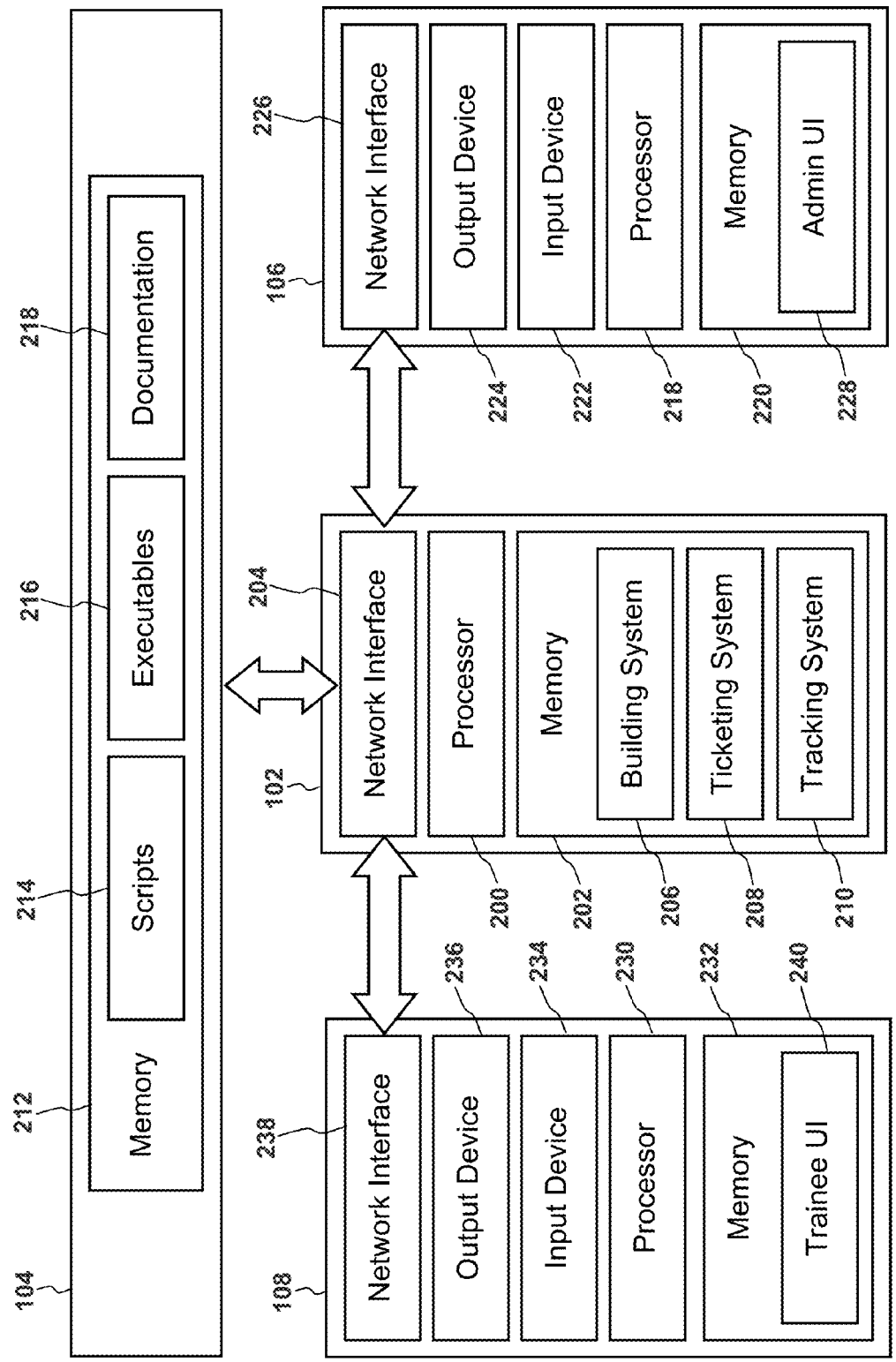
FIG. 2 is a schematic diagram illustrating an example of a server, a database, and two graphical user interfaces (GUIs) according to a non-limiting embodiment of the present disclosure.

As illustrated in FIG. 2, the simulator server 102 comprises a processor 200, a memory 202, and a network interface 204. The processor 200 may include any number of suitable CPUs that are configured to execute computer program code embodied on the memory and to perform the various functions of the simulator server 102 described below. The memory 202 may comprise one or more types of memory (e.g., RAM, ROM, EPROM, magnetic storage device, etc.) that are configured to store the computer program code executed by the processor 200 and to support the execution of that code. For example, the memory 202 may store computer program code for a building system 206, a ticketing system 208, and an issue tracking system 210 that are executed by the processor 200 to build, implement, and track different break-fix simulations. And the network interface 204 may include any number of suitable interfaces (e.g., modems, mobile browsers, wireless Internet browsers, etc.) that are configured to support communications with and between the various other devices 104-108 in the simulation system 100.

The simulator database 104 comprises a memory 212 that may comprise one or more types of memory (e.g., ROM, EPROM, magnetic storage device, etc.) that are configured to store data records, files, and other objects for access by a database management system (DBMS) provided on the simulator server 102. For example, the simulator database 104 may store the scripts 214, executables 216, and documentation 218 utilized by the simulator server 102 to implement different break-fix simulations. The simulator database 104 also may store any other data that may be required to implement different break-fix simulations, such as user profiles and configuration files.

The administrative GUI 106 comprises a processor 218, a memory 220, an input device 222, an output device 224, and a network interface 226. The processor 218, memory 220, and network interface 226 of the administrative GUI 106 may be configured in a similar manner to that described above with respect to the processor 200, memory 202, and network interface 204 of the simulation server 102, respectively. As would be understood by those of ordinary skill in the art, however, the configurations of the processor 218, memory 220, and network interface 226 of the administrative GUI 106 may be modified as required to support the functionality of the administrative GUI 106 described below. For example, the memory 220 may store an administrative user interface (UI) 228 that is executed by the processor 218 to provide administrative functionality for use in building and administering different break-fix simulations.

The input device 222 of the administrative GUI 106 may include any number of suitable devices that are configured to receive input from a user (e.g., a keypad, a microphone, a touch screen, etc.). And the output device 224 of the administrative GUI 106 may include any number of suitable devices that are configured to output data to a user in a meaningful manner (e.g., a display, a printer, a speaker, etc.). Accordingly, the administrative GUI 106 may be a personal computer, a tablet computer, a personal digital assistant (PDA), a smartphone, or other similar device.

The teaching GUI 108 comprises a processor 230, a memory 232, an input device 234, an output device 236, and a network interface 238. The processor 230, memory 232, and network interface 238 of the teaching GUI 108 may be configured in a similar manner to that described above with respect to the processor 200, memory 202, and network interface 204 of the simulation server 102, respectively; and the input device 234 and output device 236 of the teaching GUI 108 may be configured in a similar manner to that described above with respect to the input device 222 and output device 224 of the administrative GUI 106, respectively. Accordingly, the teaching GUI 108 also may be a personal computer, a tablet computer, a PDA, a smartphone, or other similar device.

As would be understood by those of ordinary skill in the art, however, the configurations of the processor 230, memory 232, and network interface 238 of the teaching GUI 108 may be modified as required to support the functionality of the teaching GUI 108 described below. For example, the memory 232 may store a trainee UI 240 that is executed by the processor 230 to provide teaching functionality for use in attempting to fix different breaks in an IT solution 110 during different break-fix simulations. Together, the building system 206, ticketing system 208, issue tracking system 210, administrative UI 228, and trainee UI 240 provide the functionality required to build, implement, and track different break-fix simulations in a virtualization of an IT solution 110.

Returning to FIG. 1, the virtualization of the IT solution 110 comprises a pair of distribution routers 112A and 112B; a first pair of load balancers 114A and 114B; a pair of authentication servers 116A and 116B; a second pair of load balancers 118A and 118B; a first pair of application servers 120A and 120B; a second pair of application servers 122A and 122B; three (3) database servers 124A, 124B, and 124C; and a customer GUI 126. The simulator server 102 generates a fully functional image of how such an IT solution 110 is or may be configured so that a support technician may practice providing break-fix support for that IT solution 110 in a safe, virtualized environment.

The virtualized IT solution 110 may be based on an IT solution 110 provided to an actual customer, or it may be a general IT solution 110 that is representative of an IT solution 110 typically provided to customers. In other words, the simulator server 102 may generate virtualizations on a customer-by-customer basis so that a support technician may practice providing break-fix support for a specific customer's IT solution 110, or it may generate more standardized virtualizations so that the support technician may receive more general training. Accordingly, it should be understood that the IT solution 110 depicted in FIG. 1 is illustrative only, and that the IT solution 110 virtualized by the simulator server 102 may comprise any number of different components (e.g., devices, applications, adapters, etc.) that may not be depicted in FIG. 1.

The building system 206 is configured to provide an administrative user with functionality for building break-fix simulations that may be implemented in the virtualized IT solution 110. More particularly, the building system 206 is configured to provide an administrative user with functionality for generating the scripts 214, executables, 216, and documentation 218 (e.g., Issue Files, Answer Files, etc.) that are utilized to implement and administer a break-fix simulation. The building system 206 also may be configured to provide an administrative user with functionality for generating user profiles and configuration files that establish different entitlements and accesses for different users with respect to different break-fix simulations. The administrative user may access that functionality via the administrative UI 228.

Turning to FIGS. 3A-3E, the administrative UI 228 comprises a plurality of build screens 300A-300E via which an administrative user may build break-fix simulations. Each build screen 300A-300E is configured to be displayed on the output device 224 (e.g., a display) of the administrative GUI 106 and comprises a simulation list 302 from which a break-fix simulation 304 may be selected, a plurality of navigation tabs 306, a text input box 308, a code insert pull-down menu 310, a create new button 312, a test run button 314, a save button 316, a save all button 318, and a publish button 320. The simulation list 302 comprises a listing of existing break-fix simulations that an administrative user may scroll through and select from to modify. Those break-fix simulations are identified based on the title of the issue that requires fixing. And an administrative user may select any on of those break-fix simulations to modify by clicking on or otherwise selecting the desired break-fix simulation from the simulation list with the input device 222 (e.g., a mouse) of the administrative GUI 106.

As depicted in FIGS. 3A-3E, the selected break-fix simulation 304 will be highlighted or otherwise identified to provide an indication to the administrative user as to which break-fix simulation he/she currently is working in. In FIGS. 3A-3E, the administrative user has selected the break-fix simulation entitled "IE error 500 Problem Description (ISO2)," which corresponds to the information displayed in the text input box 308. The administrative user may modify the selected break-fix simulation 304 by selecting different navigation tabs 306 and adding/removing text to/from the corresponding text input box 308.

Figure 3A:
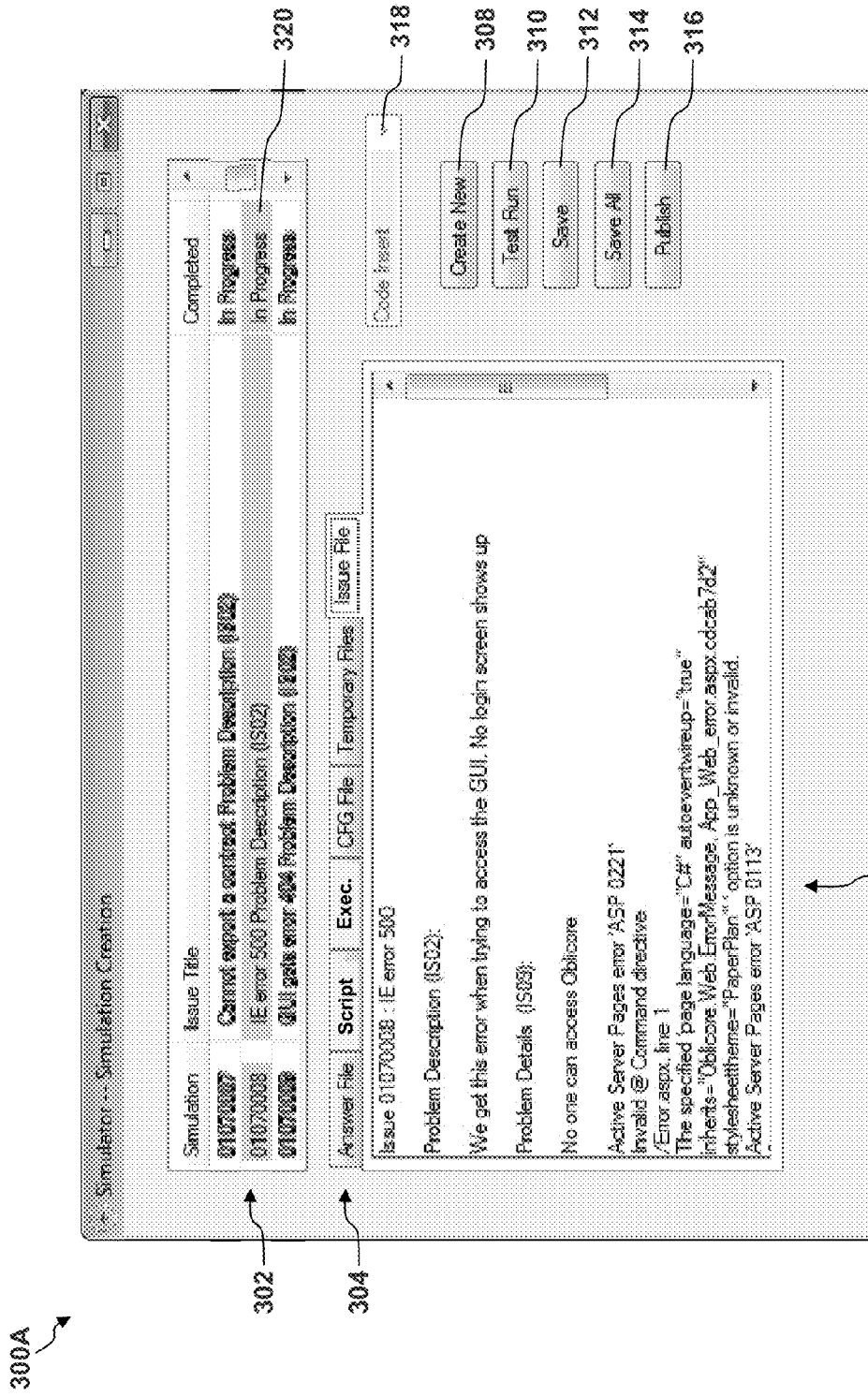
FIGS. 3A-3E are screen captures illustrating examples of build screens according to a non-limiting embodiment of the present disclosure.

In FIG. 3A, the administrative user has selected the "Issue File" tab. The text input box 308 under the Issue File tab is populated with a description of the problem(s) that require fixing in the IT solution 110. That description includes the same type of general information that a support technician may be provided by a customer experiencing the problem simulated with the selected break-fix simulation 304. The administrative user may populate that text input box 308 with information actually received from customers experiencing the same problem, or that text input box 308 may be populated with the type of information expected to be provided by a customer experiencing the subject problem. The resulting Issue File is stored on the simulator database 104 as part of the documentation 218 for the selected break-fix simulation 304 and is provided to a trainee during a break-fix simulation in the form of an incident report so that the trainee may begin to assess what component of the IT solution 110 is causing the subject problem (see, e.g., FIG. 4B).

Figure 3B:
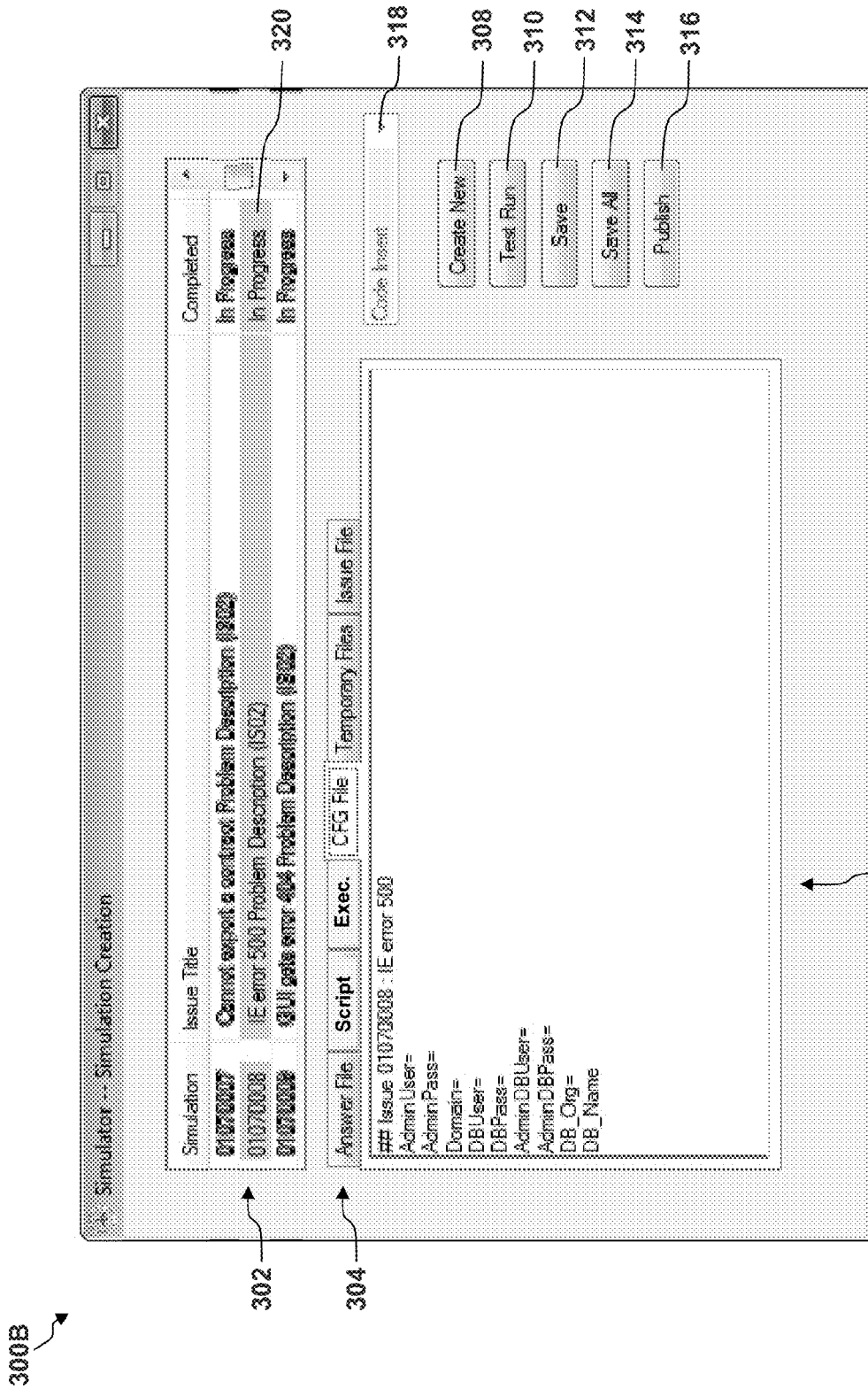

In FIG. 3B, the administrative user has selected the "CFG File" tab. The text input box 308 under the CFG File tab is populated with configuration information that defines the entitlements and accesses for the selected break-fix simulation 304. The passwords required to obtain those entitlements and accesses may be stored in user profiles on the simulator database 104. And the administrative user may modify and/or set those entitlements and accesses, as well as the corresponding passwords, by adding/removing that information to/from the text input box 308 under the CFG file tab.

Figure 3C:
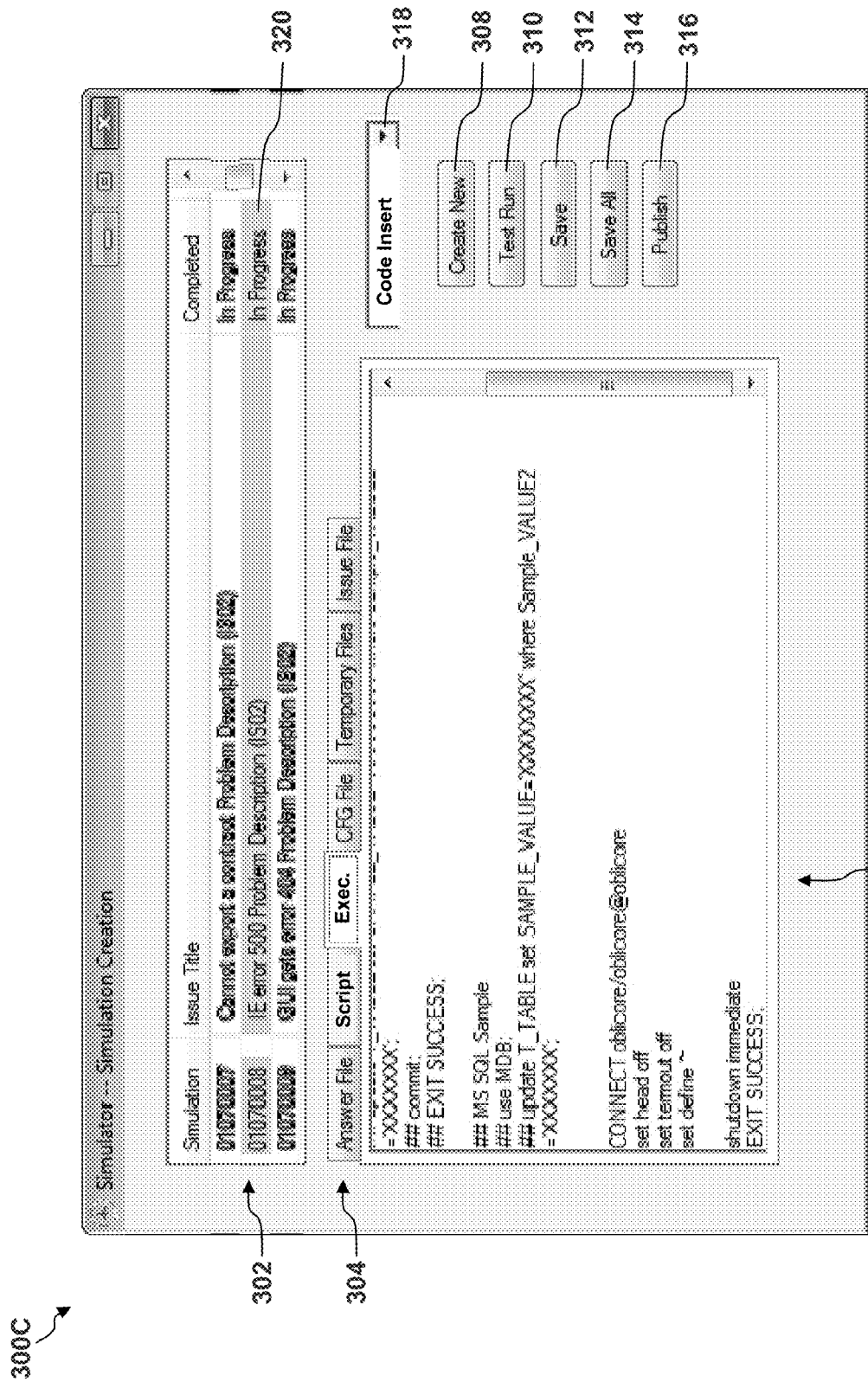

In FIG. 3C, the administrative user has selected the "Exec" tab. The text input box 308 under the Exec. tab is populated with the executables 216 that are run to break the virtualized IT solution 110 in accordance with the selected break-fix simulation 304. Those executables 216 may, for example, comprise SQL code that may be executed to invoke an instance of an IT solution 110 and execute script lines to break that IT solution 110. The administrative user may select predefined SQL code to insert into the text input box 308 by clicking on or otherwise selecting that code from a list of available code in the code insert pull-down menu 310. And the administrative user may modify any code that is in the text input box 308, or write new code to the text input box 308, by adding/removing the appropriate text to/from the text input box 308. The resulting executables 216 are stored in the simulator database 104.

Figure 3D:
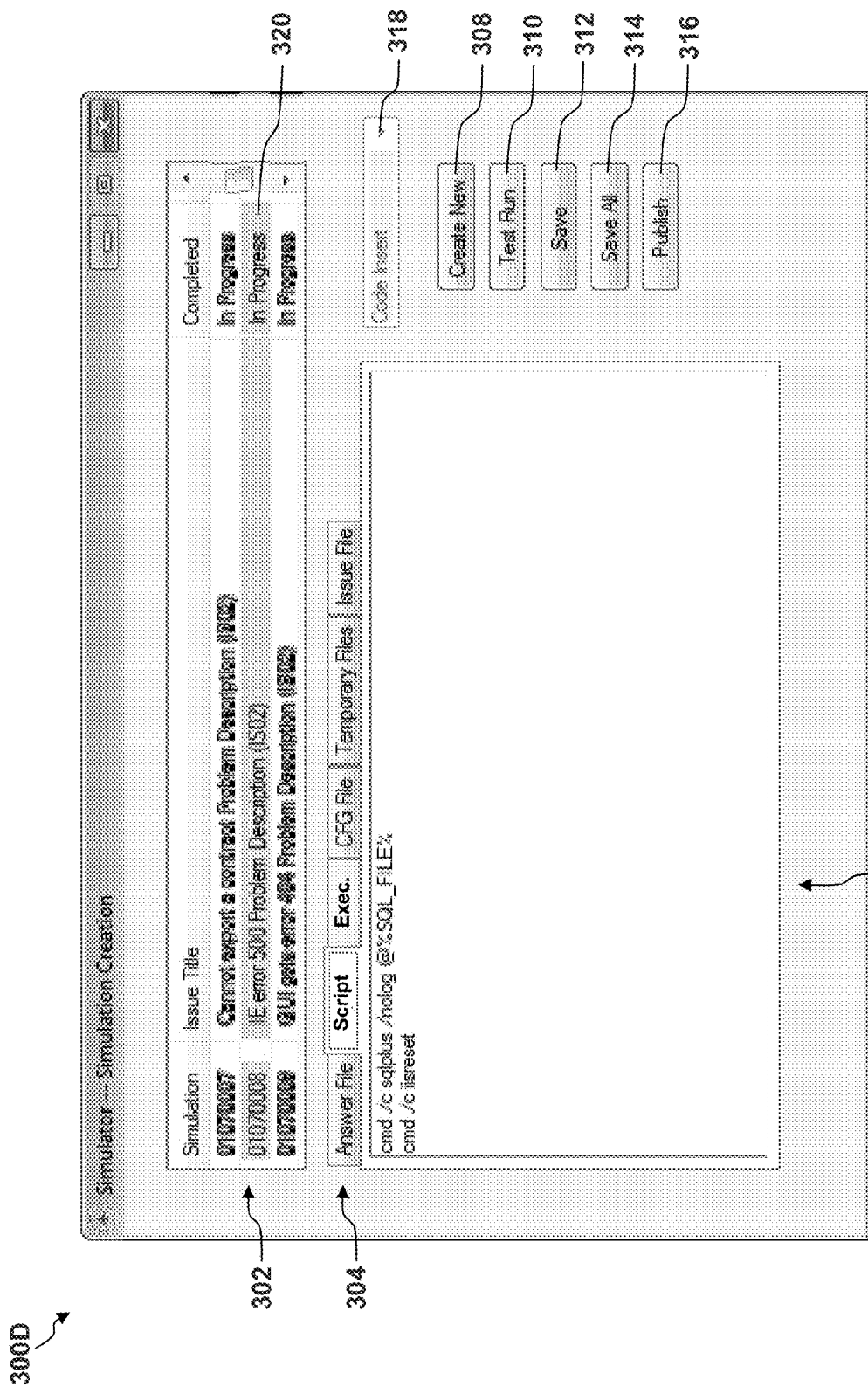

In FIG. 3D, the administrative user has selected the "Script" tab. The text input box 308 under the Script tab is populated with the scripts 214 that are executed by the executables 216 to break the virtualized IT solution 110 in accordance with the selected break-fix simulation 304. Those scripts 214 may be based on actual breaks previously fixed in customers' IT solutions 110, or they may be based on otherwise expected or predicted breaks. Thus, whenever a support technician successfully fixes a break in the field, both the fix and the break may be utilized to generate a break-fix simulation by writing scripts 214 that do what the fix was able to undue. In other words, an administrative user may write scripts 214 that do the opposite of what the support technician did to fix a break in the field so that those scripts 214 may be executed to break a virtualized image of an IT solution 110, thereby enabling a trainee to attempt to fix that break in a safe, virtualized environment. And when combined with the information provided by the customer who actually experienced that break, which may be populated into the Issue File for the corresponding break-fix simulation, a realistic break-fix simulation may be provided based on any break-fix solution provided in the field. The resulting scripts 214 are stored in the simulator database 104 with the corresponding executables 216 and documentation 218 (e.g., Issue Files, Answer Files, etc.).

Figure 3E:
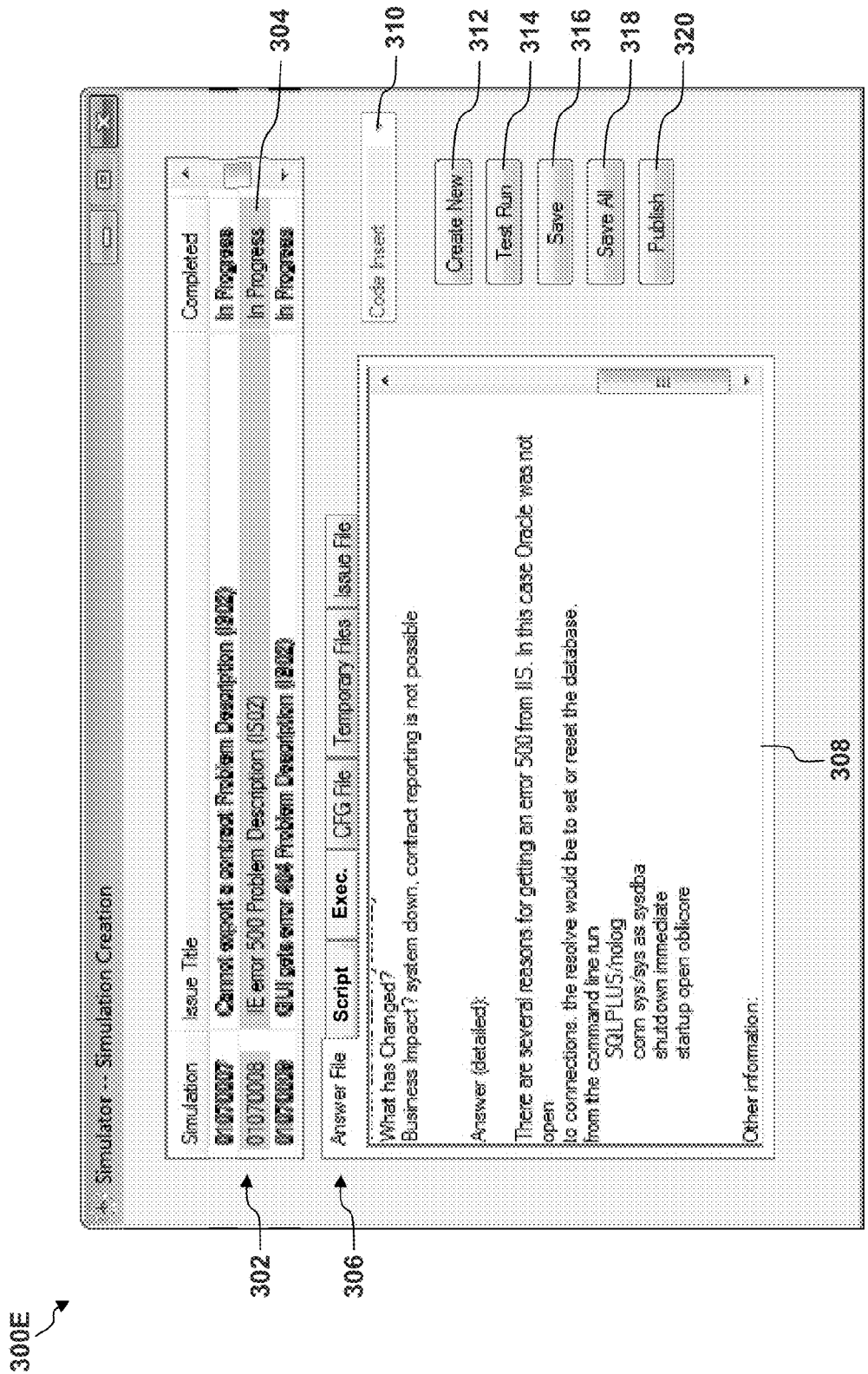

In FIG. 3E, the administrative user has selected the "Answer File" tab. The text input box 308 under the Answer File tab is populated with a description of the correct answer, or fix, for the break in the IT solution 110 generated by the selected break-fix simulation 304. That description includes the step(s) that are required to fix the break generated with the scripts 214 and executables 216. Like the Issue File and the scripts 214, the information in the Answer File also may be based on an actual fix implemented in the field for the selected break-fix simulation 304. The resulting Answer File is stored on the simulator database 104 as part of the documentation 218 for the selected break-fix simulation 304. But unlike the information in the Issue File, the information in the Answer File is not presented to the trainee during a break-fix simulation. Instead, it is available only to an administrative user during the break-fix simulation so that the administrative user may provide support to the trainee, if requested.

As an alternative to modifying an existing break-fix simulation, an administrative user also may create a new break-fix simulation by clicking on or otherwise selecting the create new button 312. The administrative user then is prompted to input a title for that break-fix simulation, which is utilized to populate the simulation list 302 if/when that break-fix simulation is published to the simulator server 102. An administrative user may create a new break-fix simulation by clicking on or otherwise selecting the different navigation tabs 306 and populating the corresponding text input boxes 308 in a similar manner to that described with respect to FIGS. 3A-3E.

After modifying and/or creating simulation content under any of the navigation tabs 306, an administrative user may test the corresponding scripts 214 and executables 216 by clicking on or otherwise selecting the test run button 314. Clicking on or otherwise selecting the test run button 314 will implement the corresponding break-fix simulation in the same manner as it would be implemented for a trainee, such that the administrative user may walk through the steps of the break-fix solution in the same manner that a trainee would. An example of those steps is described below with respect to FIGS. 4 and 5.

In addition, after modifying and/or creating simulation content under any of the navigation tabs 306, the administrative user may save the changes made under the particular tab in which that administrative user currently is working by clicking on or otherwise selecting the save button 316. Or the administrative user may save the changes made under any tab, even those in which that administrative user is not currently working, by clicking on or otherwise selecting the save all button 318. And after the administrative user has completed any modifications to an existing break-fix simulation or created a new break-fix simulation, the administrative user may publish that break-fix simulation to the simulator server 102 by clicking on or otherwise selecting the publish button 320. Upon publication, the break-fix simulation will appear in the simulation list 302 where it may be selected for subsequent modification or for use in training a trainee.

Although not depicted in the build screens 300A-300E of FIGS. 3A-3E, the building system 206 also comprises functionality for compiling multiple break-fix simulations into different training courses so that a trainee may be required to complete multiple break-fix simulations to complete a particular training course. For example, an administrative user may create a plurality of break-fix simulations for the same product and product version and compile them into a single training course for that product and product version. Similarly, an administrative user may create a plurality of break-fix simulations for similar and/or related problems and compile them into a single training course for that type of problem. Accordingly, the building system 206 enables an administrative user the flexibility to create training courses to suit different products, different problems, or even different trainees by enabling him/her to compile one or more break-fix simulations into a training course directed specifically to a particular product, problem, and/or trainee.

The ticketing system 208 and the issue tracking system 210 are configured to implement different break-fix simulations. The ticketing system 208 takes the information from the Issue File for a selected break-fix simulation 304 and generates an incident report that includes the pertinent details about the problem that needs fixing, phrased as a customer would phrase it. That incident report is presented to the support technician so that the support technician may begin to research and test the broken IT solution 110 with the issue tracking system 210 and come up with and implement the appropriate fix. The issue tracking system 210 is configured to provide a support technician that is being trained (i.e., a trainee) with functionality for researching and testing the broken IT solution 110 that emulates the same functionality that would be available to that service technician in actual practice, such that the service technician receives training in an environment that is as close as possible to what the service technician would experience in field. The trainee may access that functionality via the trainee UI 240.

Turning to FIGS. 4A-4D, the trainee UI 240 comprises a plurality of simulation screens 400A-400D via which a trainee may research and test a broken IT solution 110. Each simulation screen 400A-400D is configured to be displayed on the output device 236 of the teaching GUI 108 (e.g., a display) and comprises a more info button 402 and a request mentor button 404. A trainee may click on or otherwise select either of those buttons 402 and 404 with the input device 234 of the teaching GUI 108 (e.g., a mouse). As result of clicking on or otherwise selecting the more info button 402, the trainee is presented with more information about a particular simulation screen 400A-400D and the tasks that must be completed in that particular simulation screen 400A-400D. And as a result of clicking on or otherwise selecting the request mentor button 404, the trainee is presented with a list of possible subject mater experts that may be able to assist that trainee via the administrative UI 228 if that trainee gets stuck during a break-fix simulation.

Figure 4A:
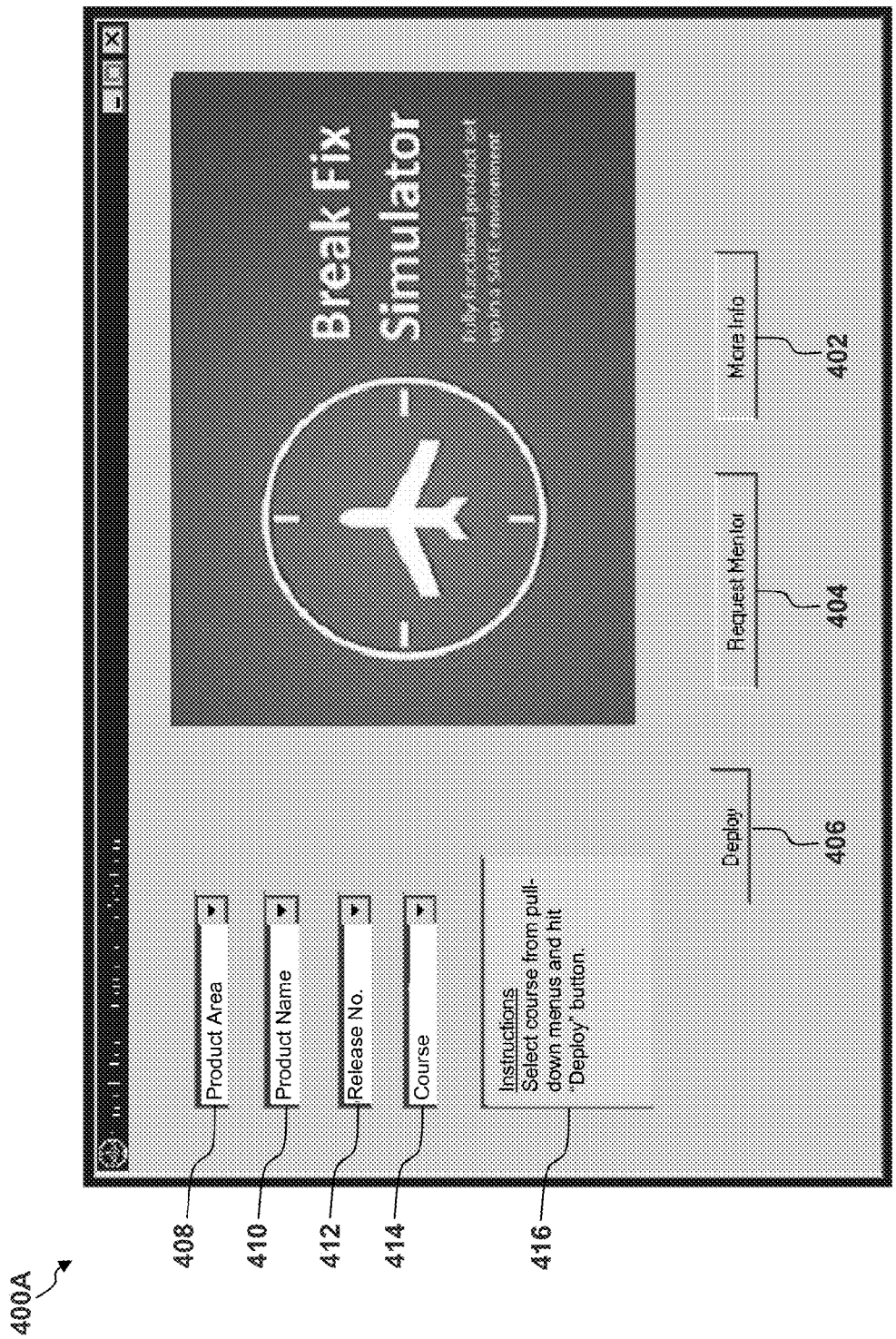
FIGS. 4A-4D are screen captures illustrating examples of simulation screens according to a non-limiting embodiment of the present disclosure.

As depicted in FIG. 4A, the first simulation screen 400A with which a trainee is presented further comprises a deploy button 406 which a trainee may click on or otherwise select to implement a training course after the trainee chooses that training course from one or more course selection pull-down menus 408-414. Each of those course selection pull-down menus 408-414 includes a list of items that a trainee may click on or otherwise select when choosing a particular training course. The first simulation screen 400A also comprises an instruction box 416 that provides the trainee with instructions regarding how to choose and implement a training course.

The first course selection pull-down menu 408 enables a trainee to select a particular product area in which he/she would like to take a training course. The second course selection pull-down menu 410 enables a trainee to select a particular product for which he/she would like to take a training course. The third course selection pull-down menu 412 enables a trainee to select a particular product release for which he/she would like to take a training course. And the fourth course selection pull-down menu 414 enables a trainee to select the particular training course. Those course selection pull-down menus 408-410 are configured to operate in a drill-down manner, via which selecting an option in a preceding course selection pull-down menu 408, 410, or 412 effects the options that are available in a succeeding course selection pull-down menu 410, 412, or 414.

For example, selecting product area "A" in the first course selection pull-down menu 410 will limit the number of products that may be selected from the second course selection pull-down menu 412 to those products within that product area; and selecting product "i" from that limited second course selection pull-down menu 412 will further limit the number of product releases that may be selected from the third course selection pull-down menu 412 to those in which the selected product has been released. In the alternative, the trainee may not select an option from one or more preceding course selection pull-down menu 408, 410, or 412 so that the options in a succeeding course selection pull-down menu 410, 412, or 414 are not limited. For example, a trainee may not make a selection from the first course selection pull-down menu 408, second course selection pull-down menu 410, or third course selection pull-down menu 408 such that all possible courses are provided as options for selection in the fourth course selection pull-down menu 414.

Figure 4B:
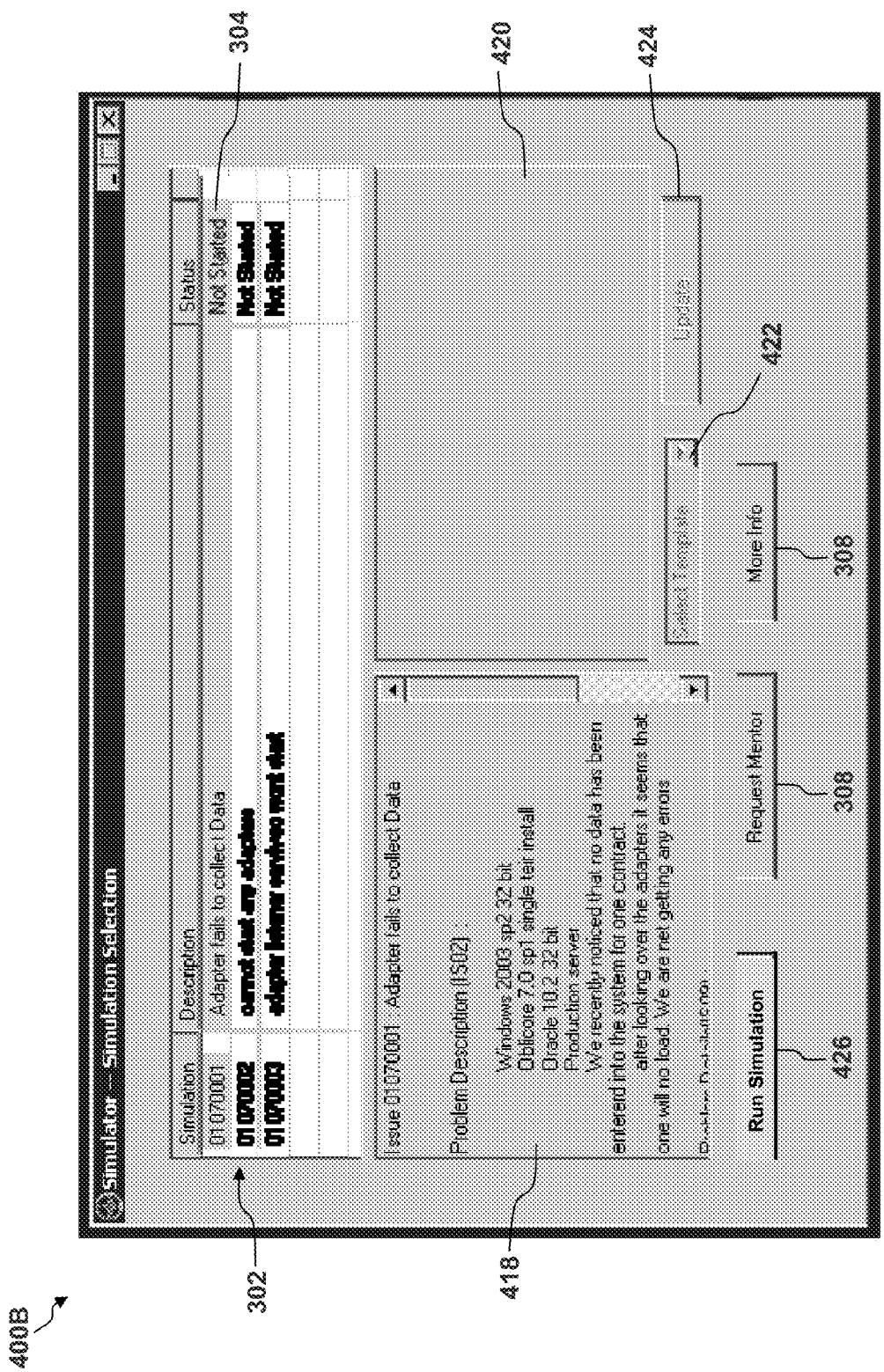
Figure 4C:
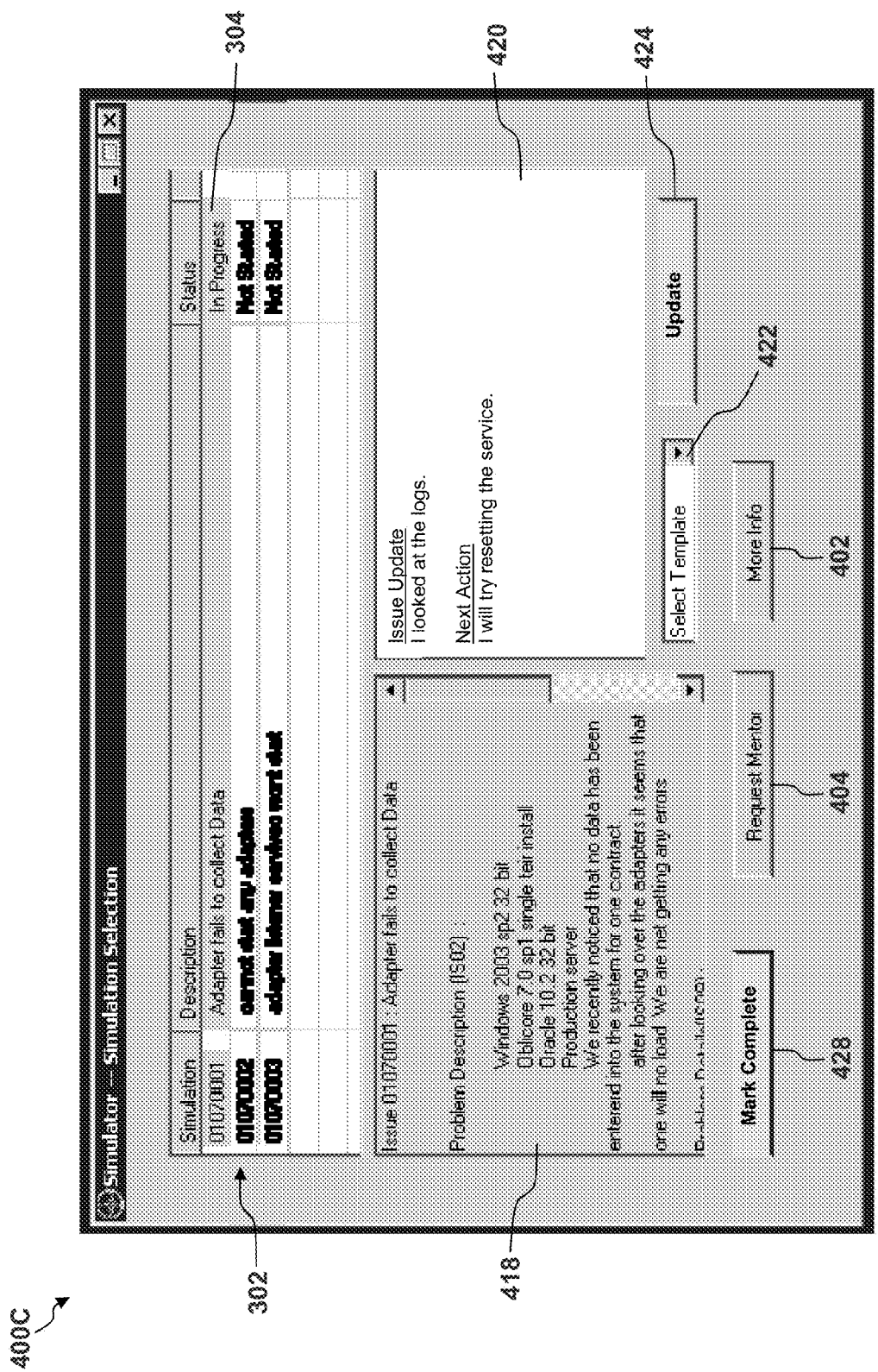
Figure 4D:
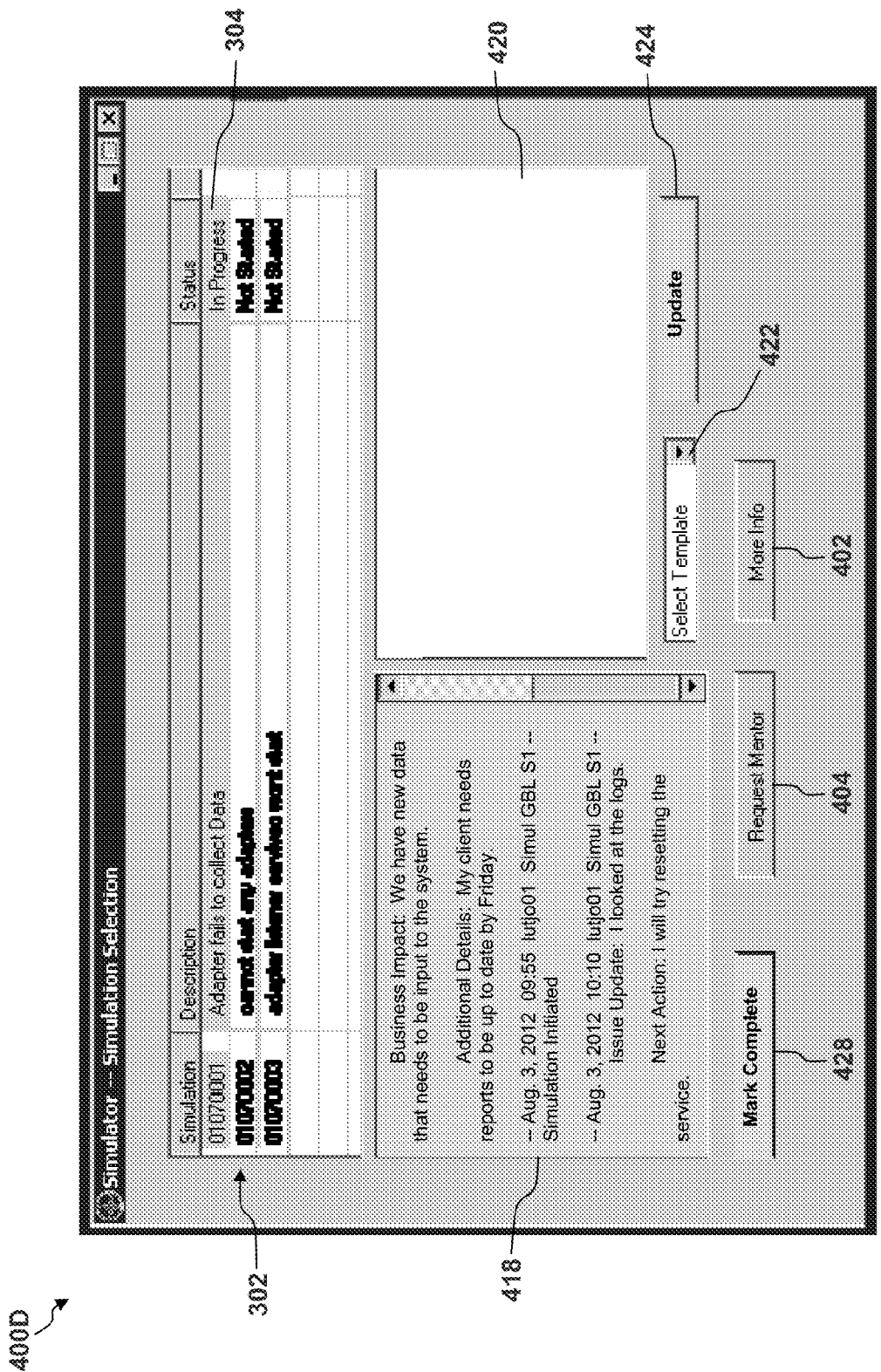

Each of the simulation screens 400B-400D depicted in FIGS. 4B-4D further comprises a simulation list 302 from which one of those break-fix simulations 304 may be selected, a break-fix log 418, a log input box 420, a template select pull-down menu 422, and a log update button 424. The second simulation screen 400B also comprises a run simulator button 426, and the third simulation screen 400C and fourth simulation screen 404D also comprise mark complete button 428. The selected break-fix simulation 304 is highlighted when clicked on or otherwise selected by the trainee. In FIGS. 4B-4D, the trainee has selected the break-fix simulation entitled "Adapter fails to collect Data," which corresponds to the information displayed in the break-fix log 418.

The simulation list 302 comprises a listing of the break-fix simulations that must be completed to complete the selected training course. The trainee may scroll through and select which break-fix simulation to run first in any order. Like the simulation list 302 provided in the administrative UI 228, those break-fix simulations are identified based on the title of the issue that requires fixing within the corresponding break-fix simulation. As depicted in FIGS. 4B-4D, the trainee has selected and implemented a course that requires the trainee to fix three (3) different problems—1) an adapter that fails to collect data; 2) the inability to start any adapters; and 3) an adapter listener service that will not start.

In FIG. 4B, the status of the selected break-fix simulation 304 is "Not Started" because the trainee has not yet initiated the selected break-fix simulation 304. Nevertheless, in response to selecting that break-fix simulation 304, the details of that break-fix simulation 304 are displayed in the break-fix log 418. As noted above, those details include a problem description as it would appear in an incident report. That problem description is based on the Issue File created with the building system 206 and comprises the type of description that would be provided by a customer experiencing the break that is simulated with the selected break-fix simulation 304. For example, that problem description may include details regarding the particular IT solution 110 in which the break occurred (e.g., operating system, solution product, product version, product configuration, etc.) as well as a general description of the problem(s) being experienced by the customer as a result of that break. Accordingly, a trainee may review each of the different break-fix simulations in a training course before selecting one to complete. The trainee then may start completing the selected break-fix simulation 304 by clicking on or otherwise selecting the run simulation button 426.

In FIG. 4C, the trainee has started completing the selected break-fix simulation 304 by clicking on or otherwise selecting the run simulation button 426. As a result, the issue tracking system 208 launches the executables 216 and executes the scripts 214 that correspond to the selected break-fix simulation 304 to break the IT solution 110. Also as a result, the status of the selected break-fix simulation 304 changes from "Not Started" to "In Progress" and the log input box 420 becomes active so that the trainee may begin inputting information to update the break-fix log 418. The trainee may input information into the log input box 420 by selecting different input types from the template select pull-down menu 422.

The template select pull-down menu 422 comprises a list of different types of input that may be input into the log input box 418 to update the break-fix log 418, and the issue tracking system 206 formats the corresponding input in the break-fix log 418 according to predefined templates. In FIG. 4C, for example, the trainee has selected an "Issue Update" template from the template select pull-down menu 422 and has input into the log input box 420 that he/she has looked at the break-fix log 418. Also in FIG. 4C, the trainee has selected a "Next Action" template from the template select pull-down menu 422 and has input into the log input box 420 that he/she will try resetting the service based on his/her review of the break-fix log 418. The trainee may update the break-fix log 418 to include the information input into the log input box 420 by clicking on or otherwise selecting the update button 424.

In FIG. 4D, the trainee has updated the break-fix log 418 to include the information input into the log input box 420 from FIG. 4C by clicking on or otherwise selecting the update button 424. As a result, that information is added to the break-fix log 418 in the format defined by the template selected from the template select pull-down menu 422 when inputting that information into the log input box 420. In FIG. 4D, for example, that format includes adding the date, time, and username that correspond to when the break-fix log 418 was updated, and by whom. That format also may include formatting changes to the text input by the trainee. Logging the various actions of the trainee in that manner allows an administrative user to effectively evaluate the trainee's performance in different break-fix simulations.

The trainee may update the break-fix log 418 in that manner until he/she fixes the break in the IT solution 110. Accordingly, the break-fix log 418 should include all of the actions taken by the trainee to provide a break-fix solution. And when the trainee successfully fixes the break in the IT solution 110, he/she may complete the selected break-fix simulation 304 by clicking on or otherwise selecting the mark complete button 428. As a result, the status of the selected break-fix simulation 304 will change from "In Progress" to "Completed," and the trainee will be directed back to the second simulation screen 400B where he/she may select another break-fix simulation from the simulation list 302 to begin completing. The trainee completes a training course by completing all of the break-fix simulations in the corresponding simulation list 302.

As noted above, the trainee may complete those break-fix simulations in any order. In other instances, the break-fix simulations may be cumulative such that the trainee must complete one break-fix simulation before moving on to the next break-fix simulation. As yet another alternative, a user may implement more than one break-fix simulation at once such that multiple breaks are generated in the IT solution 110 and the trainee must address them all at once, thereby adding a greater level of difficulty to a particular training course. The same also may be accomplished by scripting multiple breaks into a single break-fix simulation.

Figure 5:
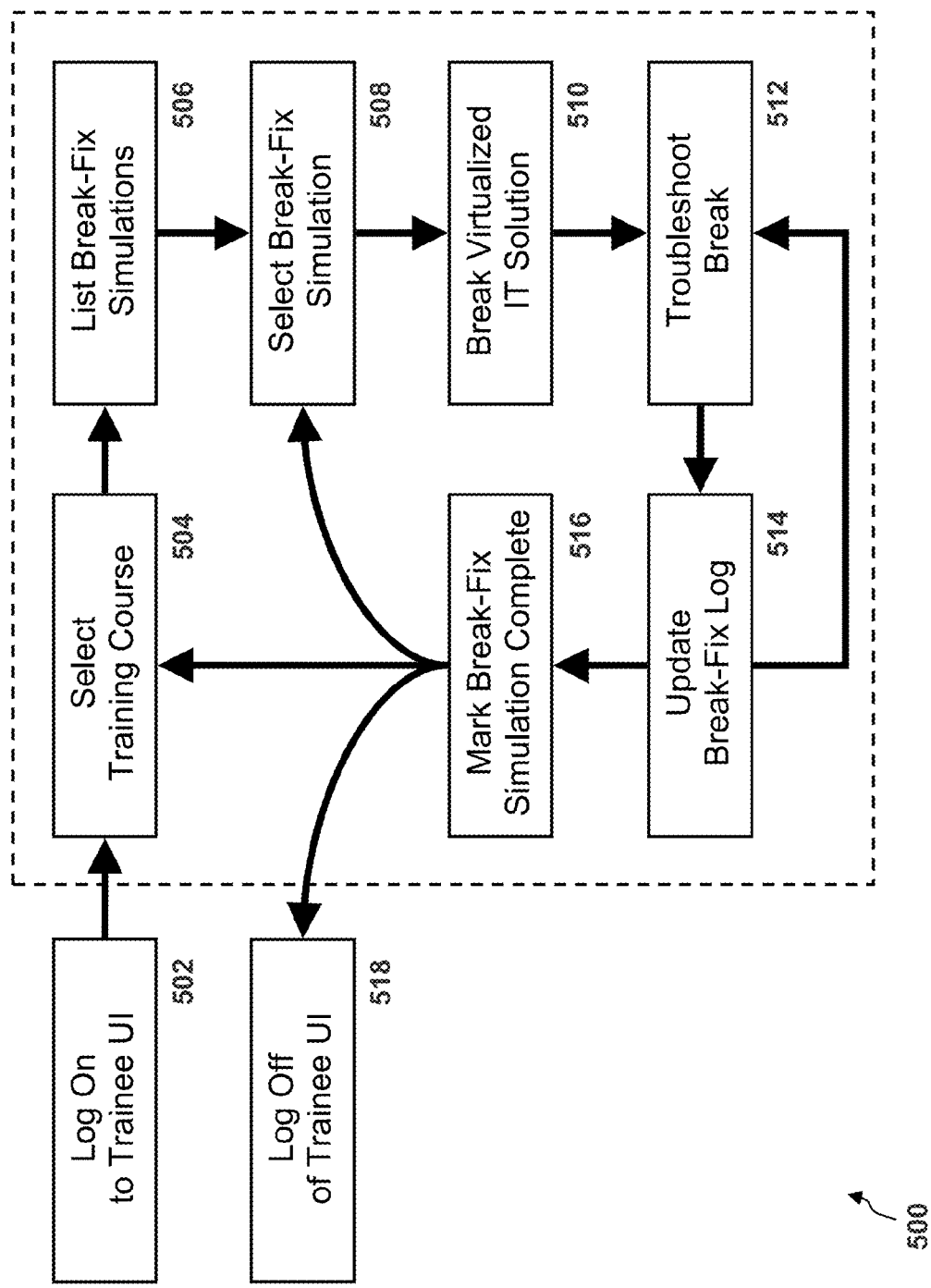
FIG. 5 is a flow diagram illustrating an example of a process for completing a break-fix training course according to a non-limiting embodiment of the present disclosure.

Turning to FIG. 5, a process 500 for completing a training course is illustrated. At step 502, a trainee logs on to the trainee UI 240 at a teaching GUI 108. The trainee's log-on credentials (e.g., username, password, etc.) may be stored in a user profile on the simulator database 104. And those log-on credentials determine the entitlements and accesses that the trainee will have, which are governed by the configuration files created by the administrative user via the building system 206.

At step 504, the trainee selects from options in the pull-down menus 408-414 in the first simulation screen 400A to drill down to the training course that he/she would like to complete, as described above with respect to FIG. 4A. When the trainee has selected the desired training course from those pull-down menus 408-414 and clicks on or otherwise selects the deploy button 406, the trainee UI 240 navigates the trainee to the second simulation screen 400B at step 506. That simulation screen 400B comprises the list of simulations 302 that must be completed to complete the selected training course.

The trainee may browse the different break-fix simulations provided in that list of simulations 302 by clicking on or otherwise selecting those different break-fix simulations and viewing the details provided in the break-fix log 418 for each one. As described above with respect to FIG. 4A, the break-fix log 418 will include a problem description and other pertinent information for the break that requires fixing in the corresponding break-fix simulation. As also described above, that information is populated into the break-fix log 418 as an incident report by the ticketing system 208 based on the Issue File created by an administrative user with the building system 206.

At step 508, the trainee selects one of the break-fix simulations from the simulation list 302 by clicking on or otherwise selecting one of those break-fix simulations and clicking on or otherwise selecting the run simulation button 426 in the second simulation screen 400B, as described with respect to FIG. 4B. Selecting a break-fix simulation in that manner causes the issue tracking system 210 to launch the executables 216 associated with the selected break-fix simulation 304, which execute the scripts 214 associated with the selected beak-fix simulation 304 to break the virtualized IT solution 110 at step 510. In the virtualized IT solution 110 depicted in FIG. 1, for example, the scripts 214 may be executed to send an update to the first pair of application services 120A and 12B to cause them to start misreading data, such as by executing the scripts 214 to change the host IP address for the first pair of application services 120A and 120B.

The scripts 214 are executed with a wrapper function so that the trainee cannot see them running and identify the break based on those scripts 214, rather than by researching and testing the break to find the appropriate fix. Otherwise, the issue tracking system 210 is configured to provide the trainee with full access to whichever tools that the trainee would normally have access to for troubleshooting breaks in an IT solution 110. And because the scripts 214 actually break the IT solution 110, the trainee cannot move on to the next break-fix simulation until the break is fixed. Nevertheless, if a trainee cannot fix a particular break, the trainee may contact an administrative user by clicking on or otherwise selecting the request mentor button 404 and having the administrative user reset the IT solution 110, which the administrative user may do utilizing the Answer File created with the building system 206.

At step 512, the trainee troubleshoots the break utilizing the tools at his/her disposal, such as by reviewing the incident report generated by the ticketing system 208 and looking over the virtualized IT solution 110 to evaluate which of the components 112-126 are working properly and which of the components 112-126 are not working properly.

And at step 514, the trainee updates the break-fix log 418 to reflect any steps he/she has taken while troubleshooting break, as described above with respect to FIGS. 4C and 4D. The trainee may repeat steps 512 and 514 as required until the break is fixed.

At step 516, the trainee indicates that the break is fixed by clicking on or otherwise selecting the mark complete button 428. But because the scripts 410 actually break the IT solution 110, the trainee cannot move on to the next break-fix simulation just by selecting the mark complete button 428. The trainee must actually fix the break to move on to the next break-fix simulation, or he/she must request that an administrative user reset the IT solution 110. Upon successful completion of the selected break-fix simulation 304, however, the trainee may select another break-fix simulation to complete at step 508 and repeat steps 508-516 as required to complete all of the break-fix simulations that are required to complete the underlying training course. The trainee also may select another training course at step 504 or log off of the trainee UI 240 at step 518.

Although the disclosed embodiments are in terms of an IT solution 110 that comprises a plurality of devices 112-126, it will be understood that those embodiments also may be implemented in any other IT solution, from an individual product to a multi-product cloud IT solution. The training provided to service technicians by those embodiments is realistic because it closely emulates what a support technician will actually experience in the field, but in a safe, virtualized environment. And the break-fix solutions utilized to provide that training are sustainable via a library of scripts 214 that may build on older versions and that only use a small data footprint, such that they require limited resources to implement. Moreover, each of the different break-fix simulations are reusable because, after being written once, the scripts 214 may be run many times on a fully functional image of an IT solution 110, rather than providing trainees with individual snapshots of a broken IT solution 110.

The schematic diagrams, screen captures, and flow diagrams depicted in FIGS. 1-5 illustrate the architecture, functionality, and operation of possible implementations of systems, methods, and computer program products according to various aspects of the present disclosure. In that regard, each block in the block diagrams or flow chart may represent a module, segment, or portion of code, which comprises one or more executable instructions for implementing the specified logical function(s). It also should be noted that, in some alternative implementations, the functions described in the block may occur out of the order depicted in the figures. For example, two blocks shown in succession may, in fact, be executed substantially concurrently, or the blocks may sometimes be executed in the reverse order, depending upon the functionality involved. It also will be noted that each block of the block diagrams and/or flowchart, and combinations of blocks in the block diagrams and/or flowchart, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An apparatus comprising a processor that is configured to execute computer-readable program code to:
    invoke a virtualization of an IT solution that is configured to provide a service via a plurality of devices that are connected to each other over a network;
    execute one or more scripts that are configured to break the virtualization of the IT solution so that at least a portion of the service fails;
    receive first input via a user interface that is configured to access one or more tools for restoring the at least a portion of the service to working order; and
    restore the at least a portion of the service to working order with the one or more tools utilizing the first input.

2. The apparatus of claim 1, wherein the processor is further configured to execute computer-readable program code to: generate a list of a plurality of training courses that each comprise one or more break-fix simulations; and receive second input to select a training course from the list of the plurality of training courses.

3. The apparatus of claim 2, wherein the processor is further configured to execute computer-readable program code to:
    generate a list comprising the one or more break-fix simulations that correspond to the training course selected with the second input;
    receive third input to select at least one of the one or more break-fix simulations that correspond to the training course selected with the second input; and
    select the virtualization of the IT solution to invoke and the one or more scripts to execute based on the at least one of the one or more break-fix simulations selected with the third input.

4. The apparatus of claim 3, wherein:
    the training course selected with the second input comprises a plurality of break-fix simulations; and
    the processor is further configured to execute computer-readable program code to:
        receive fourth input to verify that the at least one of the one or more break-fix simulations selected with the third input has been completed,
        generate a list of the one or more break-fix simulations in the training course selected with the second input that have not been completed,
        receiving fifth input to select a break-fix simulation from the list break-fix solutions that have not been completed, and
        repeating the preceding execution of the computer-readable program code until each of the plurality of break-fix simulations in the training course selected with the second input is completed.

5. The apparatus of claim 4, further comprising:
a database comprising a memory configured to store the one or more scripts;
an input device configured to receive the first input, second input, third input, fourth input, and fifth input; and
an output device configured to display the list of the plurality of training courses and the list comprising the one or more break-fix simulations.

6. The apparatus of claim 1, wherein the processor further implements the at least one break-fix simulation by:
generating an incident report that describes the break in the virtualization of the IT solution; and
logging in the incident report steps taken to fix the break in the virtualization of the IT solution.

7. The apparatus of claim 1, the processor is configured to execute computer-readable program code to execute the one or more scripts with a wrapper function to prevent execution of the one or more scripts from being viewed with the user interface.

8. A method comprising:
invoking a virtualization of an IT solution that is configured to provide a service via a plurality of devices that are connected to each other over a network;
executing one or more scripts that are configured to break the virtualization of the IT solution so that at least a portion of the service fails;
receiving first input via a user interface that is configured to access one or more tools for restoring the at least a portion of the service to working order; and
restoring the at least a portion of the service to working order with the one or more tools utilizing the first input.

9. The method of claim 8, further comprising:
generating a list of a plurality of training courses that each comprise one or more break-fix solutions; and
receiving second input to select a training course from the list of the plurality of training courses.

10. The method of claim 9, further comprising:
generating a list comprising one or more break-fix simulations that correspond to the training course selected with the second input;
receiving third input to select at least one of the one or more break-fix simulations that correspond to the training course selected with the second input; and
selecting the virtualization of the IT solution to invoke and the one or more scripts to execute based on the at least one of the one or more break-fix simulations selected with the third input.

11. The method of claim 10, wherein:
the training course selected with the second input comprises a plurality of break-fix simulations; and
the method further comprises:
receiving fourth input to verify that the at least one of the one or more break-fix simulations selected with the third input has been completed,
generating a list of the one or more break-fix simulations in the training course selected with the second input that have not been completed,
receiving fifth input to select a break-fix simulation from the list break-fix solutions that have not been completed, and
repeating the preceding elements of the method until each of the plurality of break-fix simulations in the training course selected with the second input is completed.

12. The method of claim 11, wherein:
the scripts are stored in a database comprising a memory;
the first input, second input, third input, fourth input, and fifth input are received via an input device; and
the list of the plurality of training courses and the list comprising the one or more break-fix simulations are displayed on an output device.

13. The method of claim 8, further comprising:
generating an incident report that describes the break in the virtualization of the IT solution; and
logging in the incident report steps taken to fix the virtualization of the IT solution.

14. The method of claim 8, wherein the one or more scripts are executed with a wrapper function to prevent execution of the one or more scripts from being viewed with the user interface.

15. A non-transitory computer program product that is configured to be executed by a processor, the non-transitory computer program product comprising:
computer-readable program code configured to invoke a virtualization of an IT solution that is configured to provide a service via a plurality of devices that are connected to each other over a network;
computer-readable program code configured to execute one or more scripts that are configured to break the virtualization of the IT solution so that at least a portion of the service fails;
computer-readable program code configured to receive first input via a user interface that is configured to access one or more tools for restoring the at least a portion of the service to working order; and
computer-readable program code configured to restore the at least a portion of the service to working order with the one or more tools utilizing the first input.

16. The non-transitory computer program product of claim 15, further comprising:
computer-readable program code configured to generate a list of a plurality of training courses that each comprise one or more break-fix simulations; and
computer-readable program code configured to receive second input to select a training course from the list of the plurality of training courses.

17. The non-transitory computer program product of claim 16, further comprising:
computer-readable program code configured to generate a list comprising one or more break-fix simulations that correspond to the training course selected with the second input;
computer-readable program code configured to receive third input to select at least one of the one or more break-fix simulations that correspond to the training course selected with the second input; and
computer-readable program code configured to select the virtualization of the IT solution to invoke and the one or more scripts to execute based on the at least one of the one or more break-fix simulations selected with the third input.

18. The non-transitory computer program product of claim 17, wherein:
the training course selected with the second input comprises a plurality of break-fix simulations; and
the non-transitory computer program product further comprises:
computer-readable program code configured to receive fourth input to verify completion of the break-fix simulation selected with the third input, computer-readable program code configured to generate a list of the one or more break-fix simulations in the training course selected with the second input that have not been completed, computer-readable program code configured to receive fifth input to select a break-fix simulation from the list break-fix solutions that have not been completed, and computer-readable program code configured to repeat execution of the preceding computer-readable program code until each of the plurality of break-fix simulations in the training course selected with the second input is completed.

19. The non-transitory computer program product of claim 18, wherein:

the scripts are stored in a database comprising a memory;

the computer-readable program code is configured to receive the first input, second input, third input, fourth input, and fifth input via an input device; and the computer-readable program code is configured to display the list of the plurality of training courses and the list comprising the one or more break-fix simulations on an output device.

20. The non-transitory computer program product of claim 15, further comprising:

computer-readable program code configured to generate an incident report that describes the break in the virtualization of the IT solution; and computer-readable program code configured to log in the incident report steps taken to fix the break in the virtualization of the IT solution.

21. The non-transitory computer program product of claim 15, wherein the processor is configured to execute the one or more scripts with a wrapper function to prevent execution of the one or more scripts from being viewed with the user interface.

* * * * *